Aug. 22, 1933.  E. M. BROGDEN  1,924,078
APPARATUS FOR HANDLING FRESH FRUITS
Filed May 12, 1928  3 Sheets-Sheet 1
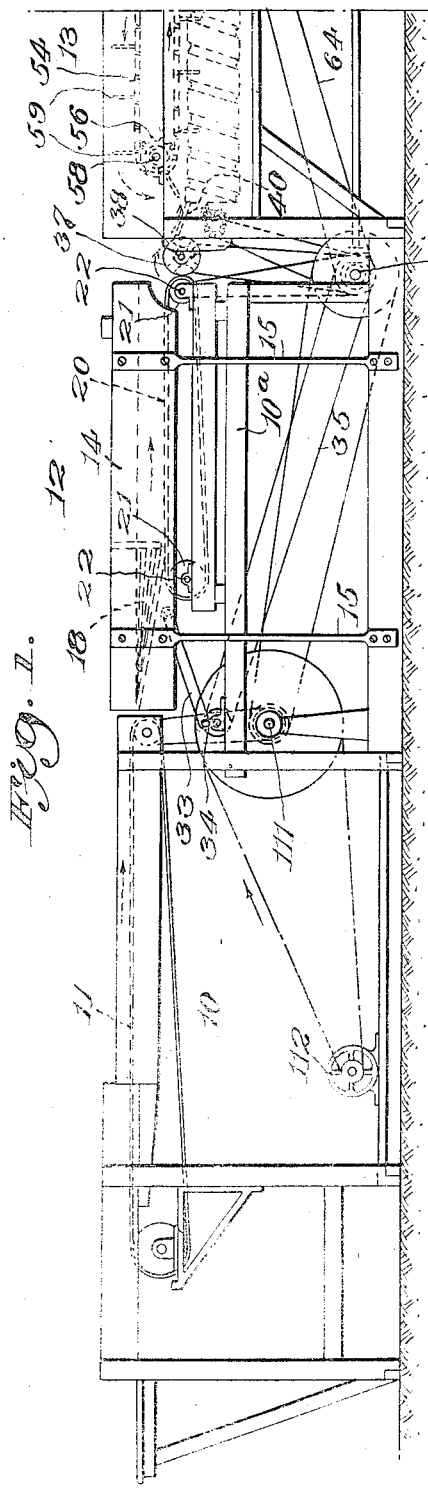
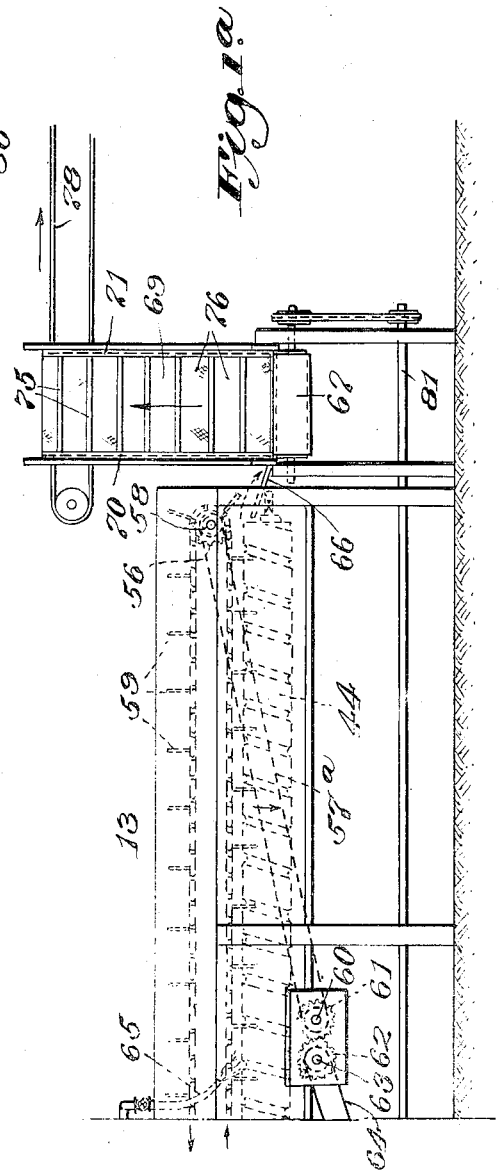
Inventor
ERNEST M. BROGDEN,
by Steward & McKay
his Attorneys

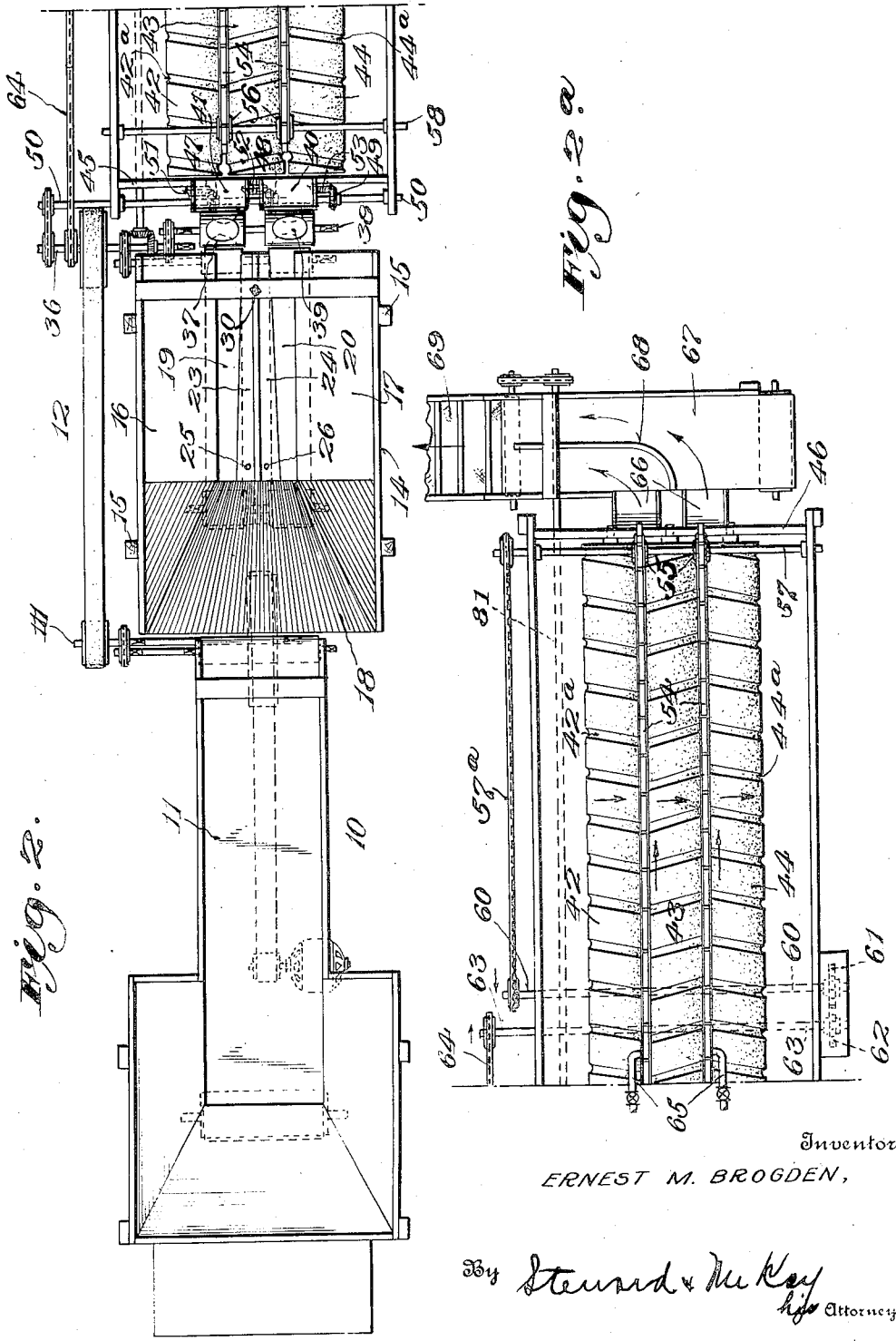

Aug. 22, 1933.  E. M. BROGDEN  1,924,078
APPARATUS FOR HANDLING FRESH FRUITS
Filed May 12, 1928  3 Sheets-Sheet 3
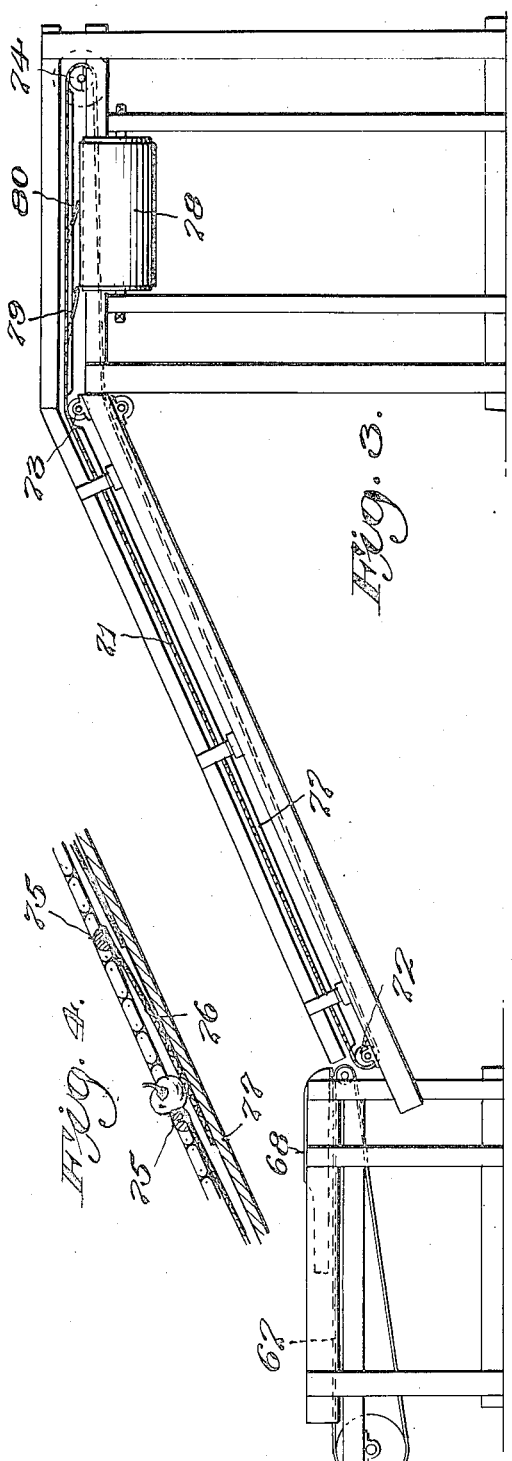
Inventor
ERNEST M. BROGDEN,
By Steward + McKay
his Attorneys Patented Aug. 22, 1933

1,924,078

UNITED STATES PATENT OFFICE 1,924,078

APPARATUS FOR HANDLING FRESH FRUITS

Ernest M. Brogden, Pomona, Calif., assignor to Brogdex Company, Los Angeles, Calif., a Corporation of Florida Application May 12, 1928. Serial No. 277,211

6 Claims. (Cl. 146—202)

This invention relates generally to apparatus for handling fresh fruits; and it relates more particularly to apparatus for handling or treating fresh fruit preparatory to marketing the same, the term "fruit" as used herein being employed in a broad sense to include not only fruit proper but also such vegetables and similar foodstuffs as can advantageously be handled in a similar or analogous manner.

This invention has to do especially with apparatus for cleansing or brushing fruit to remove undesirable foreign matter adhering thereto; the invention also including apparatus for providing the fruit with a thin film-like coating of protective or preservative material of such character as to enhance its appearance and keeping qualities.

When fruit undergoes the cleansing and brushing operations to which it is subjected under modern packing house practice in the course of preparation for market, repeated opportunity is afforded for the fruit to become injured and such injuries, however slight, are eventually a prolific source of decay. This is especially true of apples, pears and similar fruits which are picked with the stems attached and the treatment or handling of such fruits presents problems quite different from those encountered in the treatment of citrus fruit, for instance. The apple, for example, is tender and the stem is very hard and usually sticks out in such a way that when the apples are going through the brushing machines the stems rub against and scratch and puncture other apples while they are turning and rubbing against one another. This is, of course, a very serious objection. Another difficulty in connection with the handling of fruit such as apples and the like resides in the fact that apples vary greatly in shape, very frequently being quite unsymmetrical, and this has made it difficult, if not impossible, heretofore, to properly treat and brush the fruit, due to the difficulty in making the fruit turn and contact on all sides with the brushes.

An object of the present invention is to provide apparatus for handling or treating fruit and especially fruit such as apples, pears and the like, which will eliminate the above noted objections and which will handle the fruit expeditiously and with a minimum amount of care and attention.

Another object of the invention is to provide apparatus of the character described which is generally improved and perfected in various respects.

One of the important features of the present invention resides in the fact that the fruit, in going through the apparatus, not only gets a very thorough and rapid cleaning on all surfaces, but the fruit is positively carried through the brushing machine in predetermined spaced relation so that one fruit cannot bump or rub against adjacent fruit, whereby all possible danger of injury due to bruising, scratching, or stem-puncturing is eliminated. For this reason, the apparatus herein disclosed is especially suitable for treating or handling apples, pears and similar fruit, although, of course, the invention is not limited to this use.

Other objects and novel features and advantages of the invention will become apparent from the following description taken in conjunction with the accompanying drawings which illustrate one practical form of apparatus embodying the invention, it being understood that the description of this specific embodiment is merely illustrative and not restrictive.

Referring to the drawings:

Figs. 1 and 1ª considered together and placed end to end constitute a side view of an apparatus system embodying the invention, Figs. 2 and 2ª similarly taken together constitute a plan view of the apparatus shown in Figs. 1 and 1ª, Fig. 3 is a side view, looking to the left in Fig. 1ª, of the delivery conveyors, Fig. 4 is an enlarged fragmentary sectional view of the delivery elevator, Fig. 5 is an enlarged detail view showing a portion of the impellor mechanism, Figs. 6 and 7 are enlarged detail top plan and side views, respectively of the spreader or adjustment member, and Fig. 8 is an enlarged fragmentary end view of the hopper looking to the left in Figs. 1 and 2, showing the feed troughs, feed conveyors and adjustable guides.

Referring to the drawings, 10 indicates generally a supporting framework at one end of which is mounted an endless conveyor 11 on which fruit to be treated is dumped. Conveyor 11, which may be of any suitable type and construction, is, in the present instance, a wide slow-moving endless belt arranged so that as the fruit moves slowly along thereon, the culls may be picked out. Conveyor 11, which is driven from counter shaft 111, carries the fruit to a feeding mechanism indicated generally by 12 which arranges the fruit in one or more lines and presents one fruit at a time from each line to the brushing mechanism indicated generally by 13. The feeding mechanism may differ widely in construction within the broad scope of the invention but in the embodiment herein illustrated it comprises a vibrating or shaking table or hopper 14, mounted on vertically extending resilient supports or wooden springs 15 secured to the framework 10. Hopper 14 is provided with sides 16, 17 and end 18 which slope toward two comparatively short, narrow, spaced endless conveyor belts 19 and 20 mounted on pulleys 21 and shafts 22 supported on a portion $10^a$ of the stationary main frame 10. In a preferred embodiment of the invention, the end 18 and adjacent portions of the sides 16 and 17 of the hopper 14 are made of spaced slats covered with rubber or similar cushioning material, the open construction permitting leaves, twigs, dust, dirt and other refuse to be sifted out and separated from the fruit; the rubber covered slats preventing bruising of the fruit.

The two spaced conveyor belts 19 and 20, although not actually connected with the vibrating or shaking hopper 14, in effect form the bottom thereof and, in fact, form the bottoms of two feed troughs or runways, the outsides of which are formed by sloping sides 16 and 17 of the hopper and the insides of which are formed by two adjustable guides or division boards 23 and 24 mounted on vertical pivots 25 and 26, respectively, carried by the hopper 14. Means are provided for horizontally adjusting the swinging ends of the division boards or guides 23 and 24 to adjust the width of the feed troughs or runways at the bottom of the hopper in accordance with the size of the fruit being treated, thus ensuring proper alinement of the fruit. As shown in Fig. 8, the outside or swinging ends of these guide boards are each provided with a groove or guideway 27 into which projects the inclined lateral projections or flanges 28 of an adjustment member or spreader 29. The wedge-shaped adjustment member or spreader 29 is mounted on a threaded bolt 30 mounted in the end brace 31 of the hopper 14 and by turning a nut 32 on the bolt 31 the spreader member 29 is adjusted vertically and the spreader member in turn moves the guide boards 23 and 24 horizontally to widen or narrow the troughs or runways at the bottom of the hopper to expose more or less of the conveyor belts. The hopper 14 is vibrated or shaken by means of the pitman or connecting rod 33, one end of which is connected to the hopper 14 and the other end of which is connected to a crank shaft 34 journaled on the portion $10^a$ of the main frame 10, crank shaft 34 being driven by a sprocket chain 35 connected with counter shaft 36. Counter shaft 36 is driven by counter shaft 111, which in turn is driven by electric motor 112. The sloping sides and ends 16, 17, 18 and the sloping guide boards 23, 24 of the hopper 14 tend to make the fruit form in two lines on the conveyor belts 19 and 20 at the bottom of the hopper, but the shaking or oscillating movement of the hopper makes such alinement certain. The alined fruit is carried slowly by the conveyors 19 and 20 to the stop feed mechanism comprising star wheels 37, one for each conveyor or runway, mounted on shaft 38 driven from counter shaft 36. Each star wheel is provided with a plurality of pockets 39 just large enough to receive one individual fruit. Each star wheel takes one fruit at a time from the corresponding conveyor 19 or 20 and delivers it to the brushing mechanism indicated generally by 13, the fruit rolling on small delivery boards 40 and 41 as it passes from the star wheels 37 to the brushing mechanism.

The brushing mechanism comprises a plurality of cylindrical brush rolls 42, 43 and 44 rotatably mounted in juxtaposed relation, with their axes parallel, on cross-pieces or braces 45 and 46 of the framework 10, the adjacent surfaces or peripheries of each pair of brushes thus providing a fruit supporting runway that extends longitudinally of the brush rolls and parallel to their axes. The three brushes thus provide two such runways which receive the fruit from the stop feed mechanism or star wheels, the revolving brushes scrubbing and cleaning the fruit supported thereon. The brush rolls 42, 43 and 44 are rotated, preferably in the same direction, by any suitable mechanism as, for instance, bevel gear wheels 47, 48 and 49 mounted on shaft 50 suitably journaled in the frame 10, these gears meshing with bevel gears 51, 52 and 53 secured to the shafts supporting said brush rolls 42, 43 and 44, respectively, shaft 50 being driven from counter shaft 36.

As here illustrated, the brush rolls are horizontally disposed, but they may be slightly inclined either toward the receiving end (at the left in Figs. 1 and 2) or toward the delivery end (at the right in Figs. $1^a$ and $2^a$).

In order to positively advance the fruit toward the delivery end of the machine and at the same time maintain proper spacing thereof, fruit impelling or pushing mechanism is provided to engage and positively advance fruit through the brushing machine. The impelling mechanism is arranged above the fruit runways so as to permit the brush rolls to be placed adjoining one another with little or no space between thereby preventing even very small fruit from slipping or falling between said brush rolls. Another and possibly even more important advantage accruing from the location of the impelling or pusher mechanism above the fruit runways, however, resides in the fact that the impellor mechanism so located does not interfere with either the feeding or the delivery of fruit to or from the brushing mechanism, being entirely out of the path traveled by the fruit when it is not actually engaging and pushing the fruit through the runways. In the present instance, such impelling or conveyor mechanism comprises endless chains 54, one for each runway, running over sprockets 55 and 56 mounted on shafts 57 and 58 journaled in the framework 10. Each chain or belt 54 is provided with a series of spaced pusher members or fingers 59 rigidly secured thereto and the chains are mounted, one above each fruit runway and parallel thereto, so that the pushers or fingers 59 extending from the lower run or flight of each of the chains project from above into each fruit runway formed by each pair of brush rolls and engage and positively push or advance fruit through said runways. The space between any two adjacent pushers thus constitutes a pocket for receiving fruit to be advanced through the machine and the fruit in one pocket is spaced from the fruit in the other pockets during its entire travel through the machine. The pushers or fingers 59 (Fig. 5) are preferably made of some stiff unyieldable material, such as metal, covered with canvas, rubber or similar cushioning material. The chains 54 are driven by sprockets 55 and shaft 57 in such manner that the lower run or pass of each chain and the pushers secured thereto travel toward the discharge end of the machine as indicated by the arrows in Figs. 1 and 1ª. Shaft 57 is driven by sprocket chain 57ª from shaft 60, which in turn is driven by means of the changeable gearing 61, 62 from shaft 63. Shaft 63 is driven by sprocket chain 64 from countershaft 36.

In order to favor more or less gentle tumbling and irregular movements of the fruit upon varying axes as it goes through the machine and thus ensure thorough rubbing and brushing of all the surfaces thereof, brush rolls 42, 43 and 44 are provided with spiral grooves 42ª, 43ª and 44ª, respectively. As shown, the brushes are spiraled so that one brush of each pair forming a runway tends to advance the fruit toward the delivery end while the other brush tends to advance the fruit toward the feed end of the machine, thereby getting a differential turning movement of the fruit irrespective of its shape, although, of course, the grooves may be arranged so that they will all tend to advance the fruit either toward or away from the delivery end, the actual feeding or advancing of the fruit being positively controlled by the carrier-chain fingers or pushers. The differential turning movement of the fruit, due to the opposite spiraling of the brush rolls, in combination with the positive feeding or advancement of the fruit through the brushing machine by the endless pusher mechanism provides an unusually effective means for thoroughly brushing or rubbing all the surfaces of even the most irregular or imperfectly formed fruit.

Although the star wheels 37, brush rolls 42, 43 and 44 have impeller or carrier chains 54 are all driven from a common drive shaft (counter shaft 36) the speed at which the endless impeller chains advance may be varied independently of the speed of the star wheels and the rotary brush rolls by fitting the proper gears 61—62 on shafts 60 and 63, respectively. However, the speed of the star wheels 37 must be carefully timed or synchronized with the speed at which the endless impeller chains 54 advance so that one fruit will be delivered or dumped by each star wheel in the space or pocket formed between each two adjacent pushers of endless carrier or impeller chain 54. Thus it will be seen that the fruit which is segregated or spaced by the star wheel or stop feed mechanism is positively carried through the brushing machine by the endless pusher mechanism which maintains this predetermined spacing of the fruit during its entire travel through the brushing machine.

As the fruit advances through the brushing machine, it may be sprayed or coated with any suitable or desirable treating or coating material. In case it is merely desired to wash the fruit, it may be sprayed with water, but, in the example illustrated, means are shown for applying a spreadable fluid coating material of a waxy nature thereto. The means for applying this coating material may be of any suitable or desired type, but the system of atomizing or nebulizing, with the aid of compressed air, the waxy coating material, maintained in properly fluent molten condition by application of heat, and thus applying the coating material as a fine spray, mist or fog has been found very satisfactory in practice. The nozzles or spray outlets, indicated more or less diagrammatically at 65, are suitably valved so that the proper quantity of treating or coating material can be accurately adjusted to the proper amount, the nozzles, located above and slightly to one side of the fruit runways, being arranged at a slight angle to spray the fruit as it passes by in the pockets of the carrier or impellor chain. As shown, the nozzles or spray heads are mounted in from the feed end of the machine about one-third of the distance between the feed and delivery ends. With this arrangement the first third of the brush rolls is used to dust and clean the fruit and the remaining two-thirds of the brushes act to thoroughly spread and rub-in the coating material, or, in case the machine is used as a washer, the wet brushes thoroughly clean the fruit. However, any desired number of spray nozzles or atomizers can be adjusted or arranged longitudinally of the brush rolls according to the use to which the machine is to be put.

As the fruit leaves the brush rolls it passes over small delivery boards 66, one for each runway, to an endless traveling delivery belt or conveyer 67. A guide 68 is mounted over delivery belt 67 to keep the fruit coming from the runways of the brushing machine in separate lines of travel. From the delivery belt 67 the fruit may be conveyed or carried by any suitable means to the usual grading and sizing machines, but the conveying means shown herein and indicated generally by 69 is especially suited for this purpose because it handles and lets the fruit down at the delivery end without bruising it. Conveyer or elevator 69 comprises two endless chains 70 and 71 supported on sprocket wheels 72, 73, 74. These two sprocket chains 70 and 71 are connected by a plurality of slats or half-round cross pieces 75. To each cross piece is secured, one end of a piece of canvas or similar cloth 76, the endless chains 70 and 71 being mounted so that the free end of each canvas piece or flap 76 rests and drags along on a bottom portion or platform 77 of the conveyor. Each piece of canvas is wide enough to extend the full width between the endless chains 70 and 71 and slightly longer than the distance between one cross piece 75 and the next one so that as the conveyor moves along the fruit delivered thereto by the belt 67 rests on the canvas pieces or flaps which in turn are supported by the bottom board 77. The delivery end of the elevator 69 passes over a belt 78 leading to the sizing machinery and in order to let the fruit from elevator 69 down on the belt 78, the bottom portion 77 of the elevator 69 is provided with two inclined portions 79 and 80 sloping down toward belt 78, the portion 79 being slightly in advance of the portion 80 in the line of travel of the flaps. When the flaps strike the inclined portions 79 and 80 of the bottom 77, they let down, causing the fruit to roll off onto the belt 78, but as each of these sloping portions 79 and 80 extends only to the center line of, or halfway across, conveyor or elevator 69, the fruit on one half of the center line of the conveyors rolls off on one side and the fruit on the other side rolls off on that side; and as the inclined portions are in staggered relation, one half of the fruit will be delivered to one side of the belt 78 and the other half will be delivered to the other side. Thus the fruit, evenly spaced, is delivered to the belt 78 without any opportunity for it to become bruised or otherwise injured. Conveyors 67 and 69 are driven from shaft 81 driven by counter shaft 36.

It is to be understood that the invention is not limited to the exact arrangements shown and described and that various modifications can be made without departing from the spirit and scope of the broad invention as defined in the claims. For instance, although a two-runway feeding and brushing mechanism has been illustrated and described, it is obvious that any desired number of runways can be used.

What is claimed is:

1. Apparatus for treating fruit or the like comprising, in combination, revoluble rubbing elements providing a fruit runway, an endless belt mounted above said runway, said belt being provided with a series of spaced pusher members rigidly secured thereto, said pusher members projecting into and movable through said runway, and feeding mechanism including a rotary stop-feed device for delivering one fruit between every two pusher members in said runway.

2. Apparatus for treating fruit or the like comprising in combination, revoluble brush rolls cooperating to provide a fruit-supporting runway, impelling means operable to positively advance fruit through said runway, said impelling means comprising a series of spaced rigid pusher members projecting into said runway from above and movable therethrough, and means synchronized with said pusher members for feeding fruit to said runway, such feeding means feeding one fruit between every two pusher members.

3. Apparatus for treating fruit or the like comprising, in combination, revoluble brush rolls cooperating to provide a runway for fruit, means for feeding fruit to said runway in predetermined spaced relation, and impelling means operable to positively advance fruit through said runway and to maintain the predetermined spacing thereof, said impelling means comprising an endless belt mounted above said runway, said belt being provided with a series of spaced pusher members projecting into and movable through said runway.

4. Apparatus for treating fruit or the like comprising, in combination, revoluble brush rolls mounted adjacent each other and cooperating to provide a fruit-supporting runway, said brush rolls being oppositely spiraled whereby each brush roll tends to advance fruit through said runway in a direction opposite to that of the other brush roll, and impelling means arranged above said runway and operable to positively advance fruit therethrough, said impelling means comprising an endless belt provided with a series of spaced rigid pusher members rigidly secured thereto and projecting into said runway from above.

5. Apparatus for treating fruit or the like comprising the combination, with revoluble brush rolls providing a fruit runway, means providing a series of fruit-receiving pockets for positively advancing fruit through said runway, of feeding mechanism adapted to feed fruit one by one to said fruit-receiving pockets, said feeding mechanism comprising a conveyor, means for forming fruit in a single line on said conveyor, and means for supplying one fruit at a time from said conveyor to each of said pockets.

6. Apparatus for treating fruit or the like comprising the combination, with a pair of juxtaposed cylindrical brush rolls rotatably mounted with their axes parallel to provide a runway for supporting fruit, of an endless belt device mounted above said runway for movement longitudinally thereof and having a plurality of spaced pusher members projecting into said runway to thereby provide a plurality of fruit-receiving pockets, and feeding mechanism adapted to feed fruit one by one to said fruit-receiving pockets, said feeding mechanism comprising a conveyor, means for forming fruit in a single line on said conveyor, and stop feed mechanism comprising a rotary star wheel operatively timed to supply one fruit at a time to each of said pockets.

ERNEST M. BROGDEN.